July 25, 1939.  T. D. KELLY  2,167,575
ELECTRIC FURNACE
Filed April 4, 1938
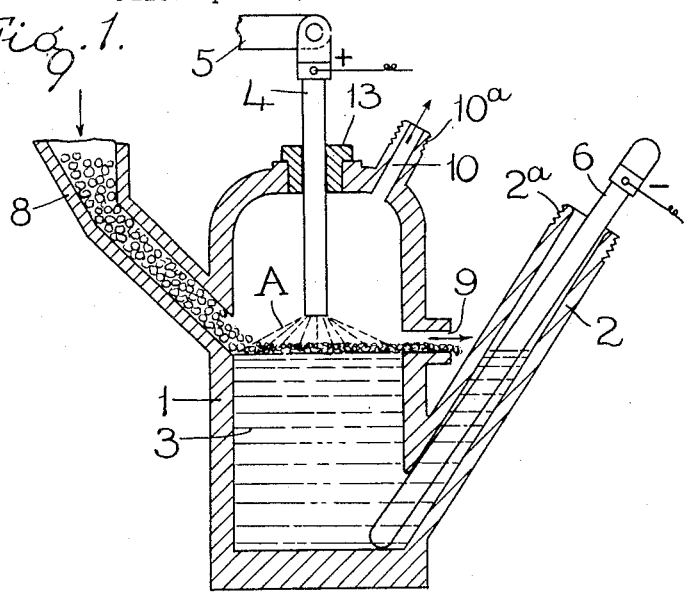
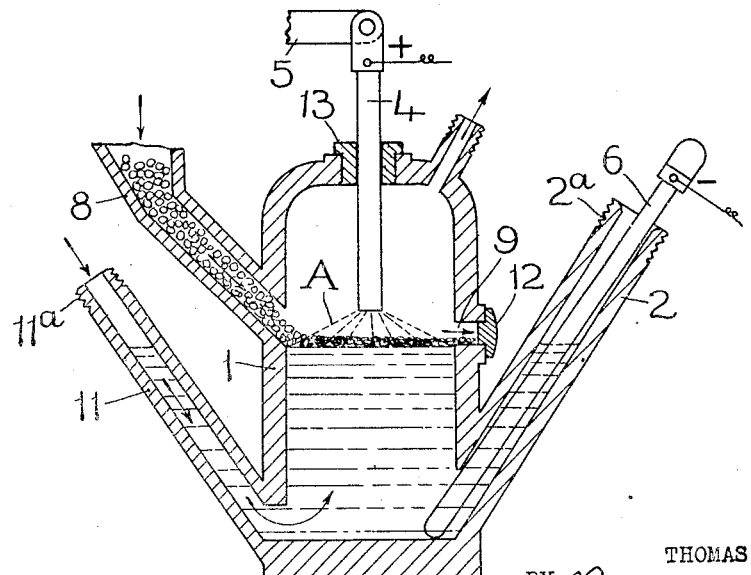
INVENTOR
THOMAS D. KELLY
BY Norris & Bateman
ATTORNEYS Patented July 25, 1939

2,167,575

UNITED STATES PATENT OFFICE 2,167,575

ELECTRIC FURNACE

Thomas Daniel Kelly, Croydon, England

Application April 4, 1938, Serial No. 199,986
In Great Britain April 8, 1937

3 Claims. (Cl. 13—9)

This invention relates to modifications in the type of electric furnace described in the specification of United States Patent No. 2,112,161 granted March 22, 1938, and has for its object to enable an electric furnace of this type to be used in the distillation and fusion of carbon at high temperatures (above 1500° C.) and the production of carbides, nitrates, cyanamides (nitro-lime) and gases of high calorific value (butane-acetylene type) which are purified and easily liquefied and condensed in suitable solvents and absorbents.

According to this invention, the furnace which comprises a chamber adapted to contain molten material and a spout communicating with the lower part of the chamber is provided with a charging conduit or inlet associated with said chamber, whereby the material to be treated can be delivered onto said molten material, and an outlet or exit for the removal or discharge of the products and gases.

The chamber may also be provided with a second spout communicating with the lower part of the chamber.

The invention will be clearly understood from the following description aided by the accompanying drawing in which—

Figure 1 is a section, more or less diagrammatic, of one construction of furnace, and Figure 2 is a similar view of a modified construction.

In all the figures 1 is the casing or body of the furnace, and 2 a spout positioned at an angle and leading to near the bottom of the casing 1 as described in my previous United States Patent No. 2,112,161.

3 is molten metal contained within the furnace and spout 2.

In the drawing, 4 is the positive or anode electrode swung from a gallows arm 5, and 6 is the negative or cathode electrode positioned in the spout 2 and its end contacting with the metal 3 in the furnace. The spout 2 is formed with a screw-thread 2a at its end for connection of a pipe line or closure cap.

In the example shown in Figure 1, in addition to the spout 2, the furnace body 1 is provided with an inlet or charging conduit 8 entering the furnace 1 at an angle level with the top of the metal 3, for introducing the materials to be treated onto the top of the molten metal 3. The furnace 1 is also provided with an outlet 9 on a level with the inlet of the conduit 8 for removal of the treated materials from the furnace, and an exit 10 in the upper part of the furnace for exit of gases, the exit being formed with a screw-thread 10a for connection of a pipe or tube.

In the example shown in Figure 2, in addition to the spout 2, charging conduit 8, outlet 9 and exit 10, a spout 11 is also provided at an angle and entering the furnace 1 at the lower end for allowing air or gases to be blown upwards through the molten metal bath 3 to be electrified during its passage, the spout 11 being provided with a screw-thread 11a for connection of a pipe from the air or gas-container or pump.

12 is a renewable plug.

The furnaces in Figures 1 and 2 are closed at the top by a stuffing box 13 which may be water-cooled and through which the electrode 4 passes.

The molten metal 3 in addition to forming a molten bath to electrify air and gases, also protects the bottom of the furnace.

As an example of the use of the furnace in the manufacture of carbide with the furnace illustrated in Figure 1, lime and carbon are fed through the conduit 8 in thin layers onto the molten metal 3 into the zone A of the arc, are fused and melt and run off through the outlet or tapping hole 9 in the same way as slag is run off from steel and iron, leaving the molten metal in the furnace, gases escaping through the exit 10.

As another example, in the manufacture of cyanamides (nitro-lime) from carbides already made, in the furnace illustrated in Figure 2, the granular carbide is introduced in thin layers on the top of the molten metal 3 through which the charging conduit 8, and air or nitrogen is fed through the spout 11 passing through the molten bath 3 and the cyanamides drawn-off through the exit 10.

In manufacturing cyanamides from carbides already made, the temperature required is only between 800° and 1200° C. and the heat from the molten bath 3 is sufficient when air or nitrogen is passed through same via the spout 11 into the thin layers of granulated carbide which being electrified instantly combines with the electrified nitrogen and generates enough heat to keep the bath molten. The cyanamides which float on top of the molten bath 3 as solids are raked off through the outlet or tapping hole 9.

For the manufacture of calcium nitrate, lime would be fed through the charging spout 8 and air or nitrogen through the spout 11.

Air is excluded when manufacturing carbides and distilling carbon at high temperature to which at any suitable period during the operations hydrogen can be added via the spout 11 and molten bath 3, and is electrified during its passage.

If the bottom of the furnace is lined with material like zirconia it will last indefinitely.

What I do claim as my invention and desire to secure by Letters Patent is:

1. An electric furnace, comprising a generally upright chamber adapted to contain molten material, a downwardly arranged spout communicating with the lower part of said chamber for receiving a cathode electrode, a stuffing box in the top of said chamber for receiving a downwardly projecting anode electrode, a downwardly projecting charging conduit or inlet communicating with said chamber just above the level of the molten material, whereby the material to be treated can be delivered onto the molten material, an outlet or tapping hole in the side of said chamber just above the level of the molten material for removal of the products, and an exit in the upper part of said chamber for exit of gases, for the purpose set forth.

2. In an electric furnace comprising a chamber adapted to contain molten material other than the material to be treated, a spout operatively associated with a side of said chamber and extending downwardly towards the bottom of said chamber and communicating therewith, a second spout operatively associated with a side of said chamber and communicating therewith towards the bottom of said chamber, a charging conduit or inlet associated with said chamber, whereby the material to be treated can be delivered onto said molten material, an outlet the wall of said chamber level with the top of said molten material for the removal or discharge of the products, and an exit for the gases.

3. In an electric furnace comprising a chamber adapted to contain molten material other than the material to be treated, a spout operatively associated with a side of said chamber and extending ddownwardly towards the bottom of said chamber and communicating therewith, a second downwardly arranged spout communicating with the lower part of said chamber whereby air, gas or vapours can be passed upwards through the molten material, a charging conduit or inlet associated with said chamber, whereby the material to be treated can be delivered onto said molten material, an outlet in the wall of said chamber level with the top of said molten material for the removal or discharge of the products, and an exit for the gases.

THOMAS DANIEL KELLY.